United States Patent Office 3,337,796
Patented Aug. 22, 1967

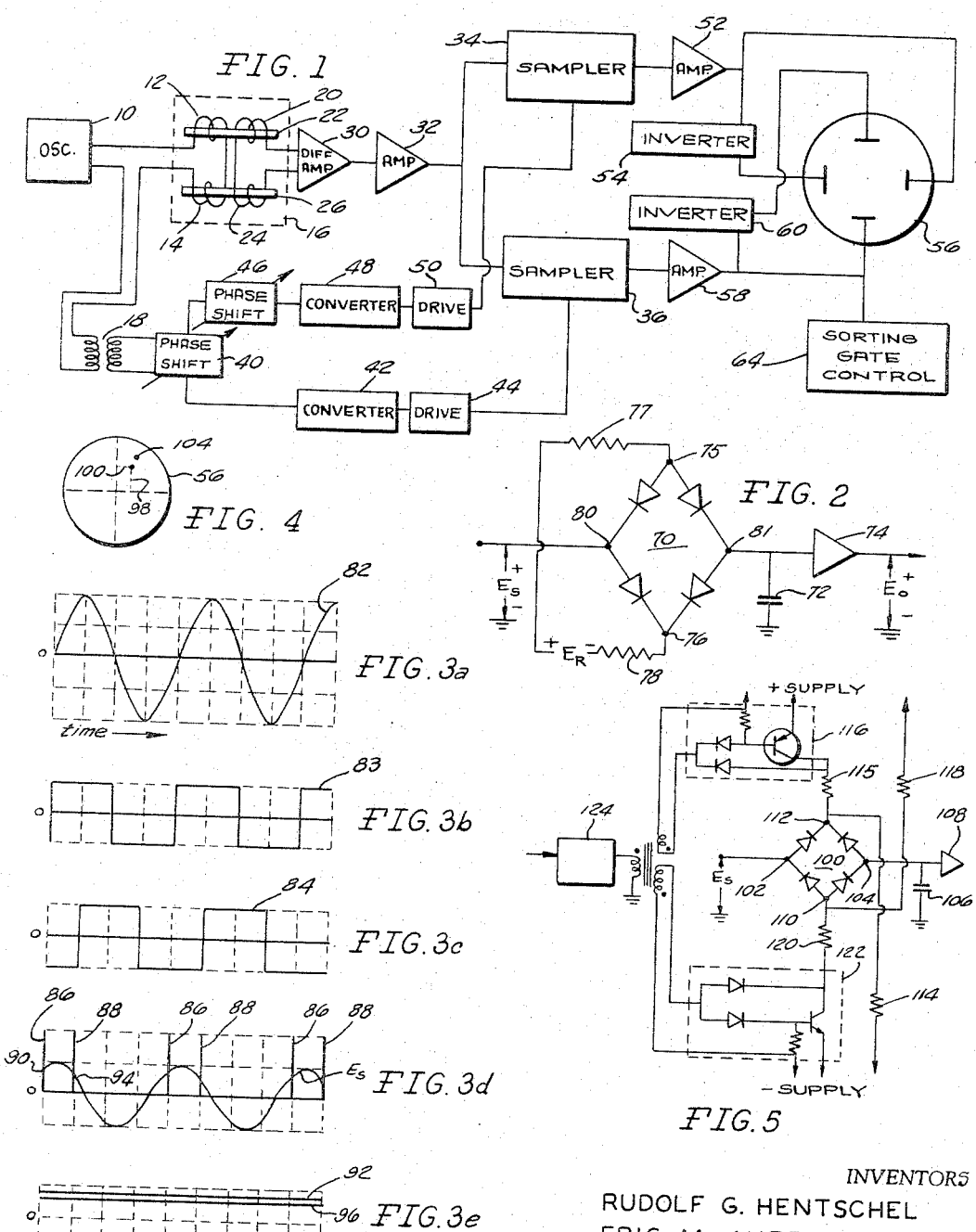

3,337,796
EDDY CURRENT TESTING DEVICE WITH MEANS FOR SAMPLING THE OUTPUT SIGNAL TO PROVIDE A SIGNAL PROPORTIONAL TO THE INSTANTANEOUS VALUE OF SAID OUTPUT SIGNAL AT A PARTICULAR PHASE
Rudolf G. Hentschel and Eric M. Aupperle, Ann Arbor, Mich., assignors to Automation-Forster, Inc., a corporation of Michigan
Filed Apr. 19, 1965, Ser. No. 448,926
14 Claims. (Cl. 324—40)

This invention relates to a method and an apparatus for non-destructive eddy current testing. This invention is an improvement over the method and apparatus of the type disclosed in the United States Letters Patent No. 2,806,992, entitled, "Measuring and Testing Instruments," granted Sept. 17, 1957, in the name of Friedrich Foerster.

One of the testing instruments disclosed in the Foerster patent provides a visual representation of the impedance plane of a test coil into which structures under test are placed. In general a pair of differential coils are excited either directly or indirectly through a primary winding by an alternating current drive signal. The impedance of one of the coils varies in response to a test specimen inserted in the coil whereas the impedance of the other coil serves as a standard as for example by inserting a standard specimen into the other coil. Outputs from the test coil and the standard coil are compared to provide a difference signal. This difference signal has phase and amplitude variations corresponding to differences in characteristics between the standard and test specimens. The difference signal is demodulated by quadrature control signals derived from the drive signal to yield a pair of unidirectional voltages which have relative magnitudes determined by the magnitude and phase of the difference signal relative to the magnitude and phase of the control signals.

In general phase demodulation is accomplished with sinusoidal control signals one of which is in phase with the drive signal for detecting resistive components of the difference signal, the other sinusoidal control signal being ninety degrees out of phase with the drive signal for detecting reactive components of the difference signal. Another type of phase detector which has been used in an apparatus of the type disclosed in the Foerster patent is a phase-controlled or synchronous rectifier operated by a square wave control signal. With either type of detector the half-cycle duration of the quadrature control signals corresponds to one-half cycle of the drive signal and the process is one of integration to yield unidirectional outputs corresponding to average values of the difference signal. The unidirectional voltages are applied to respective vertical and horizontal deflections systems of a cathode ray tube to display the difference signal as a vector point whose magnitude and direction are related to differences in the characteristics of test and standard specimens. Provisions can also be made for shifting the phase of the control signals relative to the drive signal, and thus the difference signal, while maintaining the quadrature relationship between the control signals to suppress undesired effects on the cathode ray tube display. Integration systems of the type described require many cycles to establish an average value of the resistive and reactive components. It is highly desirable to eliminate the slow response incident to synchronous detection involving an integration process, particularly where the testing apparatus is to be used in high speed automatic sorting equipment.

This invention contemplates high speed testing by a method and an apparatus of the aforementioned general type that are fast, substantially faster than the method and apparatus described hereinabove, and yet are economical and provide test results of comparable quality.

Further objects, features and advantages of this invention will become apparent from a consideration of the following description, the appended claims, and the accompanying drawings in which:

FIGURE 1 is a block diagram of a testing apparatus constructed in accordance with the present invention wherein the instantaneous value of a difference signal related to a standard specimen and a test specimen is sampled at quadrature phase positions during each cycle and stored to provide unidirectional voltages corresponding to instantaneous values of quadrature components of the difference signal;

FIGURE 2 is a circuit diagram of a simple diode bridge for sampling the difference signal;

FIGURES 3a–3e illustrate wave forms occurring in the apparatus of FIGS. 1 and 2;

FIGURE 4 illustrates an oscilloscope display of a vector point corresponding to the quadrature components of the difference signal; and FIGURE 5 is a circuit diagram of another sampling circuit useful in the apparatus shown in FIG. 1.

Referring in greater detail to the test circuit shown in FIG. 1, an oscillator 10 provides an alternating-current drive signal which is applied to a pair of primary coils 12, 14 of a probe circuit 16 enclosed by dashed lines in FIG. 1. The output signal from oscillator 10 is also applied to a transformer 18 to provide a reference signal. A secondary coil 20 associated with winding 12 is coupled thereto by a specimen 22 inserted through winding 12 and coil 20. For purposes of illustration specimen 22 is the specimen under test. A secondary coil 24 associated with the primary winding 14 is coupled thereto by a specimen 26 inserted through winding 14 and coil 24. Specimen 26 serves as a standard or reference specimen for comparison with specimen 22. Coils 20, 22 are connected to a differential amplifier 30 which compares the outputs from coils 20, 22 to provide a sinusoidal difference signal whose phase and amplitude differ from that of the drive from oscillator 10 in accordance with differences in characteristics of specimens 22, 26. The difference signal from amplifier 30 is amplified by an amplifier 32 which may provide various functions depending on the application of the circuit. For example amplifier 32 may have broad band characteristics where the test apparatus is used at different drive frequencies and may have a variable gain to control the sensitivity of the apparatus.

Various probe circuits known in the art may be used in place of the probe circuit 16 and amplifier 30 to provide useful output. The secondary coils 20, 24 may be wound such that on a given polarity of the magnetizing current in windings 12, 14 output signals fom coils 20, 24 have opposite or bucking polarities so that the output from coil 24 compensates the output from coil 20 to provide a difference signal when the outputs are added algebraically. Single primary coils may be used in place of the primary and secondary arrangement. Additionally the bridge arrangement may be replaced by a single primary or single primary and secondary where the test specimen 22 is not compared directly to the standard specimen 26 in the probe circuit 16.

In accordance with one important aspect of the present invention, the amplified difference signal from amplifier 32 is connected to a pair of samplers 34, 36 which provide unidirectional output voltages corresponding to the instantaneous value of quadrature components of the difference signal. Sampling pulses which control the particular phase at which the instantaneous value of the difference signal is sampled are obtained from the reference signal derived from oscillator 10 through transformer 18. Transformer 18 is connected to a variable phase shift circuit 40 which preferably is variable through 360 degrees. Sampler 36 is connected to the phase shift circuit 40 by a sine-to-square wave converter 42 and a drive circuit 44. Converter 42 provides a square wave reference from the sinusoidal output of phase shift circuit 40. Drive circuit 44 shapes the square wave output from converter 42 to provide the sampling pulse for sampler 36, as for example to initiate sampling on either the positive or negative swing of the square wave from converter 42. Sampler 34 is connected to the phase shift circuit 40 by a variable phase shift circuit 46, a sine-to-square wave converter 48 and a drive circuit 50. The phase shift circuit 46 introduces a ninety degree phase shift in the reference signal from phase shift circuit 40 so that the sampling pulse to sampler 34 is displaced in phase by ninety degrees from the sampling pulse to sampler 36.

Each of the samplers 34, 36 includes a holding or storage device such as a capacitor which holds the instantaneous value of a respective quadrature component of the difference signal until the occurrence of the next sampling pulse, that is, for one cycle of the drive from oscillator 10. The output from sampler 36 is a direct current voltage representing the component of the difference signal that is in phase with the sampling pulse operating sampler 36. Similarly the output from the sampler 34 is a direct current voltage representing the quadrature component of the difference signal at the phase of the sampling pulse operating sampler 34. The output from sampler 34 is applied through a direct current amplifier 52 and an inverter 54 to horizontal deflection plates of an oscilloscope 56. The output from sampler 36 is applied to the vertical deflection plates of oscilloscope 56 through a direct current amplifier 58 and an inverter 60. With this arrangement a difference signal from amplifier 30 is displayed on scope 56 as a dot whose position is determined by quadrature components of the difference signal. Also connected to the output of sampler 36 is a sorting gate control 64 which operates mechanical sorting gates when the test apparatus is used in part sorting. Preferably control 64 includes a saturated switching amplifier having a variable threshold input to respond to selected characteristic changes between specimens as disclosed in the aforementioned Foerster patent.

Referring to FIG. 2 one type of sampler useful with the present invention is illustrated as generally comprising a diode bridge 70, a storage capacitor 72, and a high impedance output amplifier 74. Since samplers 34, 36 are structurally identical and are gated by sampling pulses displaced in phase by ninety degrees, only sampler 36 will be described in connection with FIG. 2. Bridge 70 has one input connected to opposite terminals 75, 76 through resistors 77, 78 to receive sampling pulses from drive 44 by means of a balanced input (not shown). Another terminal 80 of bridge 70 is connected to amplifier 32 to receive the difference signal designated $E_s$ in FIG. 2. A terminal 81 opposite terminal 80 is connected directly to one side of capacitor 72, the other side being grounded. Amplifier 74 is connected directly across capacitor 72 and is a high impedance device so that no appreciable leakage from capacitor 72 occurs through amplifier 74. The output from amplifier 74, designated as $E_o$ in FIG. 2 is applied to amplifier 58 (FIG. 1).

The voltage across terminals 75, 76 ($E_r$, FIG. 2) is normally negative to the polarity illustrated so that the four diodes in bridge 70 are all back biased and bridge 70 appears as an open circuit to the difference signal $E_s$ and the capacitor 72. Conventional techniques may be used to assure that bridge 70 is balanced and leakage through the diodes in the bridge is negligible. In this open bridge condition the direct current voltage on capacitor 72 remains substantially constant since its input is isolated by bridge 70 and its output is isolated by amplifier 74. However when a positive sampling pulse of the polarity shown in FIG. 2 is applied to terminals 75, 76 from drive 44 the diodes in the bridge are forward biased. If the voltage at terminal 80, $E_s$, differs from the voltage at terminal 81, bridge 70 is unbalanced and current flows through bridge 70 until the voltage at terminal 81 equals the voltage at terminal 80. With the bridge 70 again balanced the voltage across capacitor 72 is equal to the voltage $E_s$ at terminal 80. The input impedance at terminal 80 is small and the time constant for capacitor 72 is also small so that the voltage across capacitor 72 can substantially follow the voltage at terminal 80 during the period of the sampling pulse supplied to terminals 75, 76. After the sampling pulse has ceased the diodes in bridge 70 are again back biased and capacitor 72 retains the instantaneous sampled value of the difference signal until the occurrence of a subsequent sampling pulse from drive 44.

The operation of the test apparatus shown in FIG. 1 and the sampling circuit shown in FIG. 2 is best understood in connection with the wave forms illustrated in FIGS. 3a-3e. With the circuit illustrated in FIG. 1 energized, in the absence of test specimen 22 and standard specimen 26, assuming the circuit is balanced, no difference signal will appear in the output of amplifier 30 and the beam in scope 56 will not be deflected from its normal position. When specimens 22, 26 are inserted into windings 12, 14 and coils 20, 24, any differences in the characteristics of specimens 22, 26 will appear as impedance variations in coils 20, 24, respectively, and the output of amplifier 30 will be a sinusoidal difference signal having a frequency of the drive from oscillator 10 and phase and amplifier variations corresponding to impedance between coils 20, 24. This difference signal is applied through amplifier 32 to samplers 34, 36 (terminal 80, FIG. 2, and the corresponding terminal in sampler 34). FIG. 3a shows the sinusoidal drive from oscillator 10 designated by numeral 82. Square wave outputs from converters 42, 48 are shown in FIGS. 3b and 3c, respectively, and are designated by numerals 83, 84. The output 84 from converter 48 is shifted ninety degrees from the output 83 of converter 42. Assuming the square wave output 83 is in phase with the drive 82 from oscillator 10, as illustrated, the positive going portions of the square wave 83 are shaped by drive 44 to provide sampling pulses 86 (FIG. 3d) which are applied to terminals 75, 76 of bridge 70. Similarly positive going portions of the square wave 84 (FIG. 3c) are shaped by drive 50 to provide sampling pulses 88 (FIG. 3d) which are applied to sampler 34. When the bridge 70 is gated open by the sampling pulse 86, capacitor 72 charges substantially instantaneously to the value 90 (FIG. 3d) of the difference signal $E_s$ (FIGS. 2 and 3d) and stores the value 90 as a level direct-current voltage 92 (FIG. 3e). The voltage on capacitor 72 will remain at this level until the next sampling pulse 86. For the example illustrated the value of $E_s$ at the phase of sampling pulses 86 is constant in subsequent cycles and thus the level of the voltage 92 across capacitor 72 remains constant. Similarly when the difference signal $E_s$ is sampled by pulses 88 in the sampler 34 the voltage across the capacitor in sampler 34 charges instantaneously to a value 94 (FIG. 3d) as illustrated by a level direct-current voltage 96 in FIG. 3e. The voltages 92, 96 representing quadrature components of the difference signal are established in substantially one cycle of the drive 82 from oscillator 10, and thus samplers 34, 36 are ready to respond to another test specimen.

The voltage 92 from sampler 36 is applied to the vertical deflection system of scope 56 to move the beam vertically a distance designated by numeral 98 in FIG. 4. Similarly the voltage 96 from sampler 34 is applied to the horizontal deflection system of scope 56 to deflect the beam horizontally a distance designated by numeral 100. For the phase relationships illustrated in FIGS. 3a-3e where the difference signal $E_s$ is sampled at phase positions corresponding to the peak point and the zero crossing of the drive signal 82 from oscillator 10, the direct current voltages 92, 96 derived from samplers 34, 36 are proportional to resistive and reactive differences reflected in coils 20, 24. When a test specimen having characteristics different from those of specimen 22 is inserted in winding 12 and coil 20, the difference output from amplifier 30 when sampled and displayed on scope 56 will cause the beam to be displayed at a different position, as for example a spot designated by numeral 104 in FIG. 4, to indicate a difference in the characteristics between test specimens. The instantaneous sampling by samplers 34, 36 achieves substantially the same display variations between test specimens as the continuous phase detection disclosed in the aforementioned Foerster patent but at a much faster speed, theoretically during one cycle of the drive 82 from oscillator 10. Since the drive 82 and the sinusoidal difference signal $E_s$ are identical in frequency, no useful information is lost when the difference signal is sampled by quadrature pulses 86, 88. The phase shift between the sampling pulses 86, 88 as determined by the phase shift circuit 46 will be maintained during inspection of a subsequent test specimen. Generally it is not essential that the phase shift be ninety degrees in order to obtain a useful difference in the display between test specimens. A ninety degree or nearly ninety degree phase shift is preferred for numerous applications to provide optimum resolution based on a Cartesian coordinate system. Any phase difference other than ninety degrees merely transforms the display on scope 56 to some other coordinate system.

FIG. 5 illustrates a modification in the diode bridge sampling circuit illustrated in FIG. 2. A rectifier bridge 100 which may be substantially similar to the bridge 70 shown in FIG. 1, has an input terminal 102 which receives the difference signal $E_s$ from amplifier 32 (FIG. 1). The opposite bridge terminal 104 is connected to a storage capacitor 106 the output of which is applied to a high impedance output amplifier 108. The remaining terminals 110, 112 of bridge 100 serve as an input for sampling pulses. Terminal 112 is connected through a resistor 114 to the negative supply and to a positive supply by a resistor 115 and a saturated transistor switch 116. Similarly terminal 110 of bridge 100 is connected to the positive supply through a resistor 118 and to the negative supply by a resistor 120 and a saturated transistor switch 122. Switches 116, 122 are controlled by a monostable multivibrator 124 coupled to the switches by a pulse transformer 126. Multivibrator 124 is driven by the output from one of the drives 44, 50 and the period of multivibrator 124 determines the length of the sampling period. The operation of the sampler shown in FIG. 5 is substantially similar to that described in connection with FIG. 2, with the saturated switches 116, 122 providing sharp balanced pulses to achieve rapid switching of bridge 100 and give a true instantaneous sampling of the difference signal. Switches 116, 122 are normally conducting to back bias the diodes in bridge 100 and are turned off by multivibrator 124 to forward bias bridge 100.

The test instrument constructed in accordance with the present invention may be operated over a broad frequency range, for example from below 100 cycles per second to several hundred kilocycles. At all test frequencies, however, the duration of the sampling pulses are substantially less than one-half cycle of the drive frequency. By way of illustration, for a 100 kilocycle drive frequency the sampling pulses would have a duration in the order of 0.5 microsecond. By way of further illustration at this frequency and sampling pulse duration with a storage capacitor (72, FIG. 2) of 200 $\mu\mu f.$, a sampling efficiency of better than 95 percent can be achieved during one cycle when the charging resistance is in the order of three or four ohms and a droop of less than one percent can be achieved when the input impedance of the amplifier (74, FIG. 2; 108, FIG. 5) is in the order of five meg.

It will be understood that the measuring and testing instrument which is herein disclosed and described is presented for purposes of explanation and illustration and is not intended to indicate limits of the invention, the scope of which is defined by the following claims.

What is claimed is:

1. In an eddy current testing device a source of alternating current, test coil means coupled to said source and arranged to be loaded by a structure under test, said coil means being responsive to loading by said structure to provide an output signal which varies in phase and amplitude in accordance with characteristics of said structure, means coupled to said source for providing a first sampling pulse having a first phase relation to said alternating current, phase shift means coupled to said source for providing a second sampling pulse having a second phase relation to said alternating current displaced in phase from said first sampling pulse, first sampling means responsive to said first sampling pulse and said output signal to provide a first component signal proportional to the instantaneous value of said output signal at said first phase, second sampling means responsive to said second sampling pulse and said output signal to provide a second component signal proportional to the instantaneous value of said output signal at said second phase, indicating means including a screen and means for producing a luminous spot on said screen, means responsive to one of said component signals for deflecting said spot in one direction on said screen, and means responsive to the other said component signal for deflecting said spot in an orthogonal direction on said screen.

2. The device set forth in claim 1 wherein said phase shift means provides a ninety degree phase relation between said first and said second sampling pulses.

3. The devices set forth in claim 1 wherein said first and second sampling pulses have a time duration substantially less than one-half cycle of said alternating current.

4. The device set forth in claim 1 wherein said first sampling means comprises means for storing said first component signal at a substantially constant level for one cycle of said first sampling pulses and said second sampling means comprises means for storing said second component signal of said output signal at a substantially constant level for one cycle of said second sampling pulses.

5. In an eddy current testing device a source of alternating current, test coil means coupling to said source and arranged to be loaded by a structure under test, said coil means being responsive to loading by said structure to provide an output signal which varies in phase and amplitude in accordance with characteristics of said structure, means coupled to said source for providing a first sampling pulse having a first phase relation to said alternating current, phase shift means coupled to said source for providing a second sampling pulse having a second phase relation to said alternating current displaced in phase from said first sampling pulse, said first and second pulses having a time duration substantially less than one-half cycle of said alternating current, first sampling means responsive to said first sampling pulse and said output signal to provide a first component signal proportional to the instantaneous value of said output signal at said first phase, second sampling means responsive to said second sampling pulse and said output signal to provide a second component signal proportional to the instantaneous value of said output signal at said second phase, first storage means responsive to said first component signal to provide a first unidirectional voltage having a substantially constant value over one cycle of said alternating current and being proportional to said first component signal, second storage means responsive to said second component signal to provide a second unidirectional voltage having a substantially constant value over one cycle of said alternating current and being proportional to said second component signal, indicating means including a screen and means for producing a luminous spot on said screen, means responsive to one of said unidirectional voltages for deflecting said spot in one direction on said screen, and means responsive to the other of said unidirectional voltages for deflecting said spot in an orthogonal direction on said screen.

6. In an eddy current testing device a source of alternating current, test coil means coupled to said source and arranged to be loaded by a structure under test, said coil means being responsive to loading by said structure to provide an output signal which varies in phase and amplitude in accordance with characteristics of said structure, first adjustable phase shift means coupled to said source for providing a first reference signal having a first phase relation to said alternating current, second phase shift means coupled to said first phase shift means and responsive to said first reference signal for providing a second reference signal having a second phase relation to said alternating current, means responsive to said first reference signal for providing a first sampling pulse at said first phase, means responsive to said second reference signal for providing a second sampling pulse at said second phase, first sampling means responsive to said first sampling pulse and said output signal to provide a first component signal proportional to the instantaneous value of said output signal at said first phase, second sampling means responsive to said second sampling pulse and said output signal to provide a second component signal proportional to the instantaneous value of said output signal at said second phase, indicating means including a screen and means for providing a luminous spot on said screen, means responsive to said first component signal for deflecting said spot in one direction on said screen, and means responsive to said second component signal for deflecting said spot in an orthogonal direction on said screen.

7. In an eddy current testing device a source of alternating current, test coil means coupled to said source and arranged to be loaded by a structure under test, said coil means being responsive to loading by said structure to provide an output signal which varies in phase and amplitude in accordance with characteristics of said structure, means for providing a standard output signal having a predetermined phase and amplitude corresponding to a standard structure, means responsive to said test output signal and said standard output signal for providing a difference signal which varies in phase and amplitude in accordance with differences in characteristics between said test structure and said standard structure, first phase shift means coupled to said source for providing a first reference signal having a first phase relation to said alternating current, means responsive to said reference signal for providing a first train of sampling pulses thaving a repetition rate corresponding to the frequency of said alternating current, means including a second phase shift means and responsive to said reference signal for providing a second train of sampling pulses having a repetition rate corresponding to the frequency of said alternating current and displaced in phase approximately ninety degrees relative to said first train of sampling pulses, first sampling means responsive to the first sampling pulses and said difference signal to provide a first component signal proportional to the instantaneous value of said difference signal at said first phase, a second sampling means responsive to said second sampling pulses to provide a second component signal proportional to the instantaneous value of said different signal at ninety degrees from said first phase, a first capacitor coupled to said first sampling means and responsive to said first component signal to provide a first unidirectional voltage having a substantially constant value between successive pulses in said first pulse train, a second capacitor coupled to said second sampling means and responsive to said second component signal to provide a second unidirectional voltage having a substantially constant value between successive pulses in said second pulse train, and means responsive to one of said unidirectional voltages for indicating said value of one of said unidirectional voltages.

8. The device set forth in claim 7 wherein one of said sampling means comprises a four terminal rectifier bridge, one pair of opposite terminals being operatively connected to one of said pulse trains, one terminal in the other pair of opposite terminals being connected to said difference signal and the other terminal in said other terminal pair being connected to one of said capacitors.

9. In an eddy current testing apparatus a source of alternating current, test coil means coupled to said source and arranged to be loaded by a structure under test, said coil means being responsive to loading by said structure to provide an output signal which varies in phase and amplitude in accordance with characteristics of said structure, means coupled to said source for providing successive sampling pulses having a first phase relation to said alternating current, said pulses having a time duration substantially less than one-half cycle of said alternating current, sampling means responsive to said each sampling pulse and said output signal to provide a component signal proportional to the instantaneous value of said output signal at said first phase, storage means responsive to said component signal for providing a unidirectional voltage proportional to said instantaneous value for a duration between successive pulses, indicating means including a screen and means for producing a luminous spot on said screen, and means responsive to said unidirectional voltage for deflecting said spot on said screen.

10. In a method of comparing characteristics of a test specimen wherein a source of alternating current is coupled to a test coil and said coil is arranged to be loaded by a specimen under test, said coil being responsive to loading by said specimen to provide an output signal which varies in phase and amplitude in accordance with characteristics of said specimen, the steps of sampling said output signal for a time duration substantially less than one-half cycle of said alternating current at a first and a second phase during one cycle of said output signal to obtain the instantaneous values of said output signal at said first and said second phase, and then storing said instantaneous values for one cycle of said output signal to obtain a pair of unidirectional voltages corresponding to said instantaneous values.

11. In an eddy current testing device a source of alternating current,
  test coil means coupled to said source and arranged to be loaded by a structure under test, said coil means being responsive to loading by said structure to provide an output signal which varies in phase and amplitude in accordance with characteristics of said structure,
  means coupled to said source for providing a first sampling signal having a first phase relation to said alternating current,
  means coupled to said source for providing a second sampling signal having a second phase relation to said alternating current displaced in phase from first sampling signal,
  first sampling means responsive to said first sampling signal and said output signal to provide a first component signal proportional to the instantaneous value of said output signal at said first phase,
  second sampling means responsive to said second sampling signal and said output signal to provide a second component signal proportional to the instantaneous value of said output signal at said second phase, and
  output means coupled to at least one of the sampling means and responsive to the component signal therefrom to indicate the characteristic of said structure.

12. In an eddy current testing device a source of alternating current,
   test coil means coupled to said source and arranged to be loaded by a structure under test, said coil means being responsive to loading by said structure to provide an output signal which is a function of the characteristics of said structure,
   first sampling means coupled to said source and responsive to said alternating current and effective to sample said output signal to provide a first component signal proportional to the instantaneous value of said output signal,
   second sampling means coupled to said source and responsive to said alternating current and effective to sample said output signal to provide a second component signal proportional to the instantaneous value of said output signal, and
   control means coupled to at least one of the sampling means and responsive to the component signal therefrom.

13. In an eddy current testing device a source of alternating current,
   test coil means coupled to said source and arranged to be loaded by a structure under test, said coil means being responsive to loading by said structure to provide an output signal which varies in phase and amplitude in accordance with characteristics of said structure,
   means coupled to said source for providing a sampling signal having a predetermined phase relation to said alternating current,
   sampling means responsive to said sampling signal and said output signal to provide a component signal proportional to the instantaneous value of said output signal at said phase, and
   means coupled to the sampling means and responsive to said component signal.

14. In an eddy current testing device a source of alternating current,
   test coil means coupled to said source and arranged to be loaded by a structure under test, said coil means being responsive to loading by said structure to provide an output signal which varies in accordance with the characteristics of said structure,
   sampling means coupled to said source and said coil means for sampling said output signals at predetermined phase angles to provide a pair of component signals proportional to the instantaneous values of said output signal at said phase angles,
   indicating means coupled to said sampling means and including a screen and means for producing a luminous spot on said screen,
   means responsive to one of said component signals for deflecting said spot in one direction on said screen, and
   means responsive to the other said component signal for deflecting said spot in an orthogonal direction on said screen.

References Cited

UNITED STATES PATENTS

| | | | |
|---|---|---|---|
| 2,920,269 | 1/1960 | Hanysz et al. | 324—40 |
| 3,159,784 | 12/1964 | Haslett et al. | 324—40 |

RUDOLPH V. ROLINEC, *Primary Examiner.*

RICHARD B. WILKINSON, *Examiner.*

R. J. CORCORAN, *Assistant Examiner.*